United States Patent
Morrissey et al.

(10) Patent No.: US 9,857,501 B2
(45) Date of Patent: Jan. 2, 2018

(54) SYSTEM AND METHOD FOR A WIRELESS PHONE ENABLED WITH WEATHER ALERTS

(75) Inventors: Michael Morrissey, Overland Park, KS (US); Andrew Cook, Lenexa, KS (US); Jade Kerr, Kansas City, MO (US); Clinton Smoyer, Raymore, MO (US); Mohit Mathur, Olathe, KS (US)

(73) Assignee: CenturyLink Intellectual Property LLC, Denver, CO (US)

( * ) Notice: Subject to any disclaimer, the term of this patent is extended or adjusted under 35 U.S.C. 154(b) by 584 days.

(21) Appl. No.: 12/371,270

(22) Filed: Feb. 13, 2009

(65) Prior Publication Data

US 2010/0210248 A1     Aug. 19, 2010

(51) Int. Cl.
   *H04Q 7/10*   (2006.01)
   *G01W 1/02*   (2006.01)
   *H04M 1/725*  (2006.01)

(52) U.S. Cl.
   CPC ......... *G01W 1/02* (2013.01); *H04M 1/72572* (2013.01); *H04M 1/7253* (2013.01); *H04M 2250/02* (2013.01)

(58) Field of Classification Search
   CPC .... H04W 76/007; H04W 4/12; G08B 27/001; G08B 25/016; G08B 25/006; H04M 1/7253
   USPC ....... 455/404.1, 412.1, 412.22, 412.3, 444.4, 455/414.1, 414.2–414.4; 370/338; 340/601, 539.28, 7.48
   See application file for complete search history.

(56) References Cited

U.S. PATENT DOCUMENTS

| | | | |
|---|---|---|---|
| 5,390,237 A | 2/1995 | Hoffman, Jr. et al. | |
| 5,740,538 A | 4/1998 | Joyce et al. | |
| 6,177,873 B1 | 1/2001 | Cragun | |
| 6,462,665 B1 * | 10/2002 | Tarlton et al. | 340/601 |
| 6,650,902 B1 | 11/2003 | Richton | |
| 6,914,525 B2 | 7/2005 | Rao et al. | |
| 6,995,686 B2 * | 2/2006 | Gosdin et al. | 340/905 |
| 7,054,612 B2 * | 5/2006 | Patel | 455/404.1 |
| 7,079,631 B1 | 7/2006 | Kaufman | |
| 7,233,781 B2 | 6/2007 | Hunter et al. | |
| 7,672,233 B2 | 3/2010 | Koch et al. | |
| 8,682,280 B1 * | 3/2014 | Sennett et al. | 455/404.1 |
| 8,698,640 B1 * | 4/2014 | Gropper | 340/601 |
| 9,215,330 B2 | 12/2015 | Dwyer et al. | |

(Continued)

OTHER PUBLICATIONS

U.S. Appl. No. 12/258,254; Final Rejection dated Mar. 1, 2013; 16 pages.

(Continued)

*Primary Examiner* — Kathy Wang-Hurst
*Assistant Examiner* — Julio Perez
(74) *Attorney, Agent, or Firm* — Swanson & Bratschun, L.L.C.

(57) ABSTRACT

A system and method for processing weather alerts through a cell phone. One or more channels of a radio network of a weather service are received through the cell phone. One or more weather alerts are received through the one or more channels. A determination is made whether the one or more weather alerts are applicable to a user of the cell phone. The one or more weather alerts are communicated to a user through the cell phone in response to determining the one or more weather alerts are applicable to the user.

15 Claims, 3 Drawing Sheets

(56) References Cited

U.S. PATENT DOCUMENTS

| | | | |
|---|---|---|---|
| 2003/0097262 A1* | 5/2003 | Nelson | 704/235 |
| 2003/0125876 A1 | 7/2003 | Root et al. | |
| 2004/0043760 A1* | 3/2004 | Rosenfeld et al. | 455/414.3 |
| 2004/0172657 A1 | 9/2004 | Phillips et al. | |
| 2004/0185915 A1* | 9/2004 | Ihara | H04M 1/6066 455/569.1 |
| 2005/0009508 A1* | 1/2005 | Graske et al. | 455/414.3 |
| 2005/0030977 A1 | 2/2005 | Casey et al. | |
| 2005/0037728 A1* | 2/2005 | Binzel et al. | 455/404.1 |
| 2006/0055527 A1 | 3/2006 | Pugel | |
| 2006/0154690 A1* | 7/2006 | Hess | 455/552.1 |
| 2006/0267783 A1* | 11/2006 | Smith | 340/601 |
| 2007/0066366 A1* | 3/2007 | Graham | G08B 27/006 455/567 |
| 2007/0136743 A1 | 6/2007 | Hasek et al. | |
| 2008/0214207 A1* | 9/2008 | Karabinis | H04B 7/18513 455/456.1 |
| 2009/0102644 A1* | 4/2009 | Hayden | 340/540 |
| 2009/0316671 A1* | 12/2009 | Rolf et al. | 370/338 |
| 2010/0087138 A1* | 4/2010 | Hedstrom | 455/3.01 |
| 2010/0104073 A1 | 4/2010 | Dwyer et al. | |
| 2011/0230204 A1* | 9/2011 | Root et al. | 455/456.1 |
| 2011/0302615 A1 | 12/2011 | Helferich | |

OTHER PUBLICATIONS

U.S. Appl. No. 12/258,254; Final Rejection dated May 3, 2012; 16 Pages.

U.S. Appl. No. 12/258,254; Non-Final Rejection dated Apr. 2, 2014;15 pages.

U.S. Appl. No. 12/258,254; Non-Final Rejection dated Oct. 9, 2012; 14 pages.

U.S. Appl. No. 12/258,254; Non-Final Rejection dated Oct. 18, 2011; 25 pages.

U.S. Appl. No. 12/258,254; Notice of Allowance dated Nov. 4, 2014; 18 pages.

Weatherline, Inc. Weather Now, Get Your Local Weather, http://www.weatherline.com/cgi/citysearch.asp, date unknown, p. 1.

Post Gazette Now, "Gloomy day: It's end of the line for 936-1212," by Gary Rotstein, http://www.post-gazette.com/pg/08271/915611-85.stm, pp. 1-3.

U.S. Appl. No. 12/258,254; Issue Notification dated Nov. 24, 2015; 1 page.

U.S. Appl. No. 12/258,254; Notice of Allowance dated Aug. 14, 2015; 24 pages.

U.S. Appl. No. 12/258,254; Supplemental Notice of Allowability dated Oct. 13, 2015; 3 pages.

\* cited by examiner

SYSTEM AND METHOD FOR A WIRELESS PHONE ENABLED WITH WEATHER ALERTS

BACKGROUND OF THE INVENTION

Wireless technologies have improved nearly exponentially in recent years. The improvements are fostered by enhancements in hardware, software, communications standards, protocols, and increased availability to communications networks. Despite the improvements, many wireless users are still unable to receive weather alerts and other weather information. As a result, some wireless users may be at an increased risk of experiencing severe weather and other disasters or events. At the very least, wireless users may be unaware of pending or existing happenings.

BRIEF SUMMARY OF THE INVENTION

One embodiment provides a system and method for processing weather alerts through a cell phone. One or more channels of a radio network of a weather service may be received through the cell phone. One or more weather alerts may be received through the one or more channels. A determination may be made whether the one or more weather alerts are applicable to a user of the cell phone. The one or more weather alerts may be communicated to a user through the cell phone in response to determining the one or more weather alerts are applicable to the user.

Another embodiment provides a cell phone for receiving weather alerts. The cell phone may include a transceiver operable to receive one or more weather channels of a radio network. The cell phone may also include alert logic operable to determine whether one or more alerts received through the one or more channels are applicable to a location of the user. The cell phone may also include a user interface operable to communicate the one or more alerts to the user.

Yet another embodiment provides a cell phone for communicating weather alerts. The cell phone may include a processor operable to execute a set of instructions and a memory being operable to store the set of instructions. The set of instructions may be operable to receive one or more channels of a weather service through the cell phone utilizing a radio network, receive one or more weather alerts through the one or more radio channels and the one or more weather alerts being associated with the location of the cell phone, determine whether the one or more weather alerts are applicable to a user of the cell phone, and communicate the one or more weather alerts to a user through the cell phone in response to determining the one or more weather alerts are applicable to the user.

BRIEF DESCRIPTION OF THE DRAWINGS

Illustrative embodiments of the present invention are described in detail below with reference to the attached drawing figures, which are incorporated by reference herein and wherein.

DETAILED DESCRIPTION OF THE INVENTION

The illustrative embodiments provide a system and method for receiving weather information and alerts through a wireless device. The wireless device may be a cell phone, personal digital assistant (PDA), mp3 player enabled for communications, electronic book, evolution data optimized (EVDO) card, or other device that may be enabled for voice communications. In one embodiment, the wireless device is a cell phone utilized by a user.

The wireless device may be configured or enabled to receive any number of weather frequencies, broadcasts, alerts, or channels. In one embodiment, the weather information may be received from the National Oceanic and Atmospheric Administration (NOAA) operated by the National Weather Service (NWS) Office within the United States Department of Commerce. In one embodiment, the weather related broadcasts, channels, frequencies, communications, and information may be received through a dedicated radio network. In another embodiment, the channel may be another public or private channel that provides weather information through an analog or digital signal.

In one embodiment, the wireless device may receive the weather broadcasts continuously, periodically, or may scan or monitor the weather broadcasts for important information. The wireless device may utilize user preferences, settings, parameters, or other information to determine the information that is communicated to the user. The information may be communicated audibly, visually, or tactilely through a display, speakers, screen, vibrator, tactile interface, or other interface element of the wireless device.

In another embodiment, the weather information received through the weather broadcasts may be communicated to a Bluetooth® or other electronic device linked or communicating with the wireless device. For example, the wireless device may communicate a weather alert included in the weather information to an earpiece linked with the wireless device. In another embodiment, the wireless device may determine how and when weather information is displayed or otherwise communicated to the user. For example, the weather information may be communicated to the user based on a location or user preferences specified by the user. In one embodiment, the location of the user and wireless device may be determined by wireless triangulation or a global positioning system (GPS). The location may be utilized to select relevant weather information, alerts, and events for the user based on the determined location. In another embodiment, the user preferences stored in the memory of the wireless device may store zip codes, cities, counties, or other geographic locations for which the user selects to receive weather alerts or information.

Figure 1:
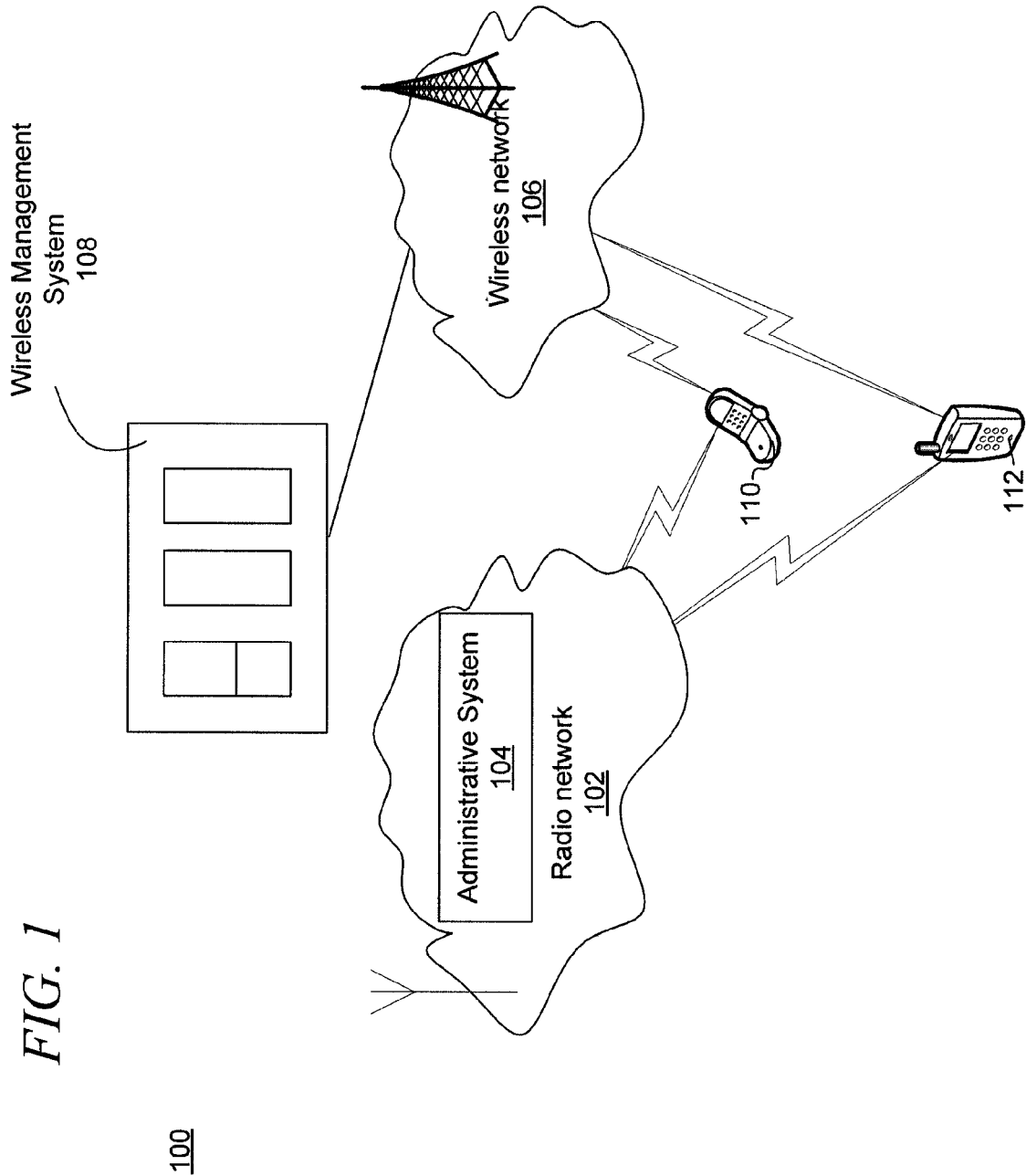
FIG. 1 is a pictorial representation of a communication system in accordance with an illustrative embodiment.

FIG. 1 is a pictorial representation of a communication system in accordance with an illustrative embodiment. The communications system 100 is one embodiment of a system that may be utilized to generate, send, receive, and process weather alerts and information included in the weather broadcasts. The communications system 100 may include any number of elements, components, devices, circuits, systems, and equipment.

In one embodiment, the communications system 100 may include a radio network 102, an administrative system 104, a wireless network 106, a wireless management system 108, and wireless devices 110 and 112. The wireless management system 108 is one, or more systems, devices, and equipment utilized to enable, initiate, route, and manage communications between one or more telephonic devices. The wireless management system 108 may include one or more devices networked to manage the wireless network 106. For example, the wireless management system 108 may include any number of home location registers (HLRs), virtual location registers (VLRs), mobile switching centers (MSCs), antennas, servers, routers, switches, or advanced intelligent devices.

The wireless network 106 is infrastructures for sending and receiving messages and signals wirelessly according to one or more designated formats, standards, and protocols. The wireless network 106 may communicate with the wireless devices 110 and 112 utilizing communications protocols, such as time division multiple access (IDMA), code division multiple access (CDMA), global systems for mobile (GSM) communications, personal communications systems (PCS), WLAN, WiMAX, or other frequently used cellular and data communications protocols and standards. The networks of the communications system 100 may represent a single communication service provider or multiple communications services providers. The features, services, and processes of the illustrative embodiments may be implemented by one or more elements of the communications system 100 independently or as a networked implementation. In another embodiment, the radio network 102 may be configured to communicate with the wireless devices 110 and 112 utilizing the aforementioned standards and protocols.

The radio network 102 is a network of radio stations broadcasting continuous weather information to individuals and organizations from any number of systems, equipment, or offices. The radio station 102 broadcast weather related warnings, watches, forecast, and hazardous information. The radio network 102 may also broadcast information and alerts for non-weather emergencies, such as national security, natural disasters, environmental, and public safety. For example, the radio network 102 may broadcast warnings and post-event information for events and hazards, including earthquakes, avalanches, storm surges, tidal waves, tornadoes, hurricanes, hail storms, chemical releases, freezing rain, oil spills, large car accidents, terrorist attacks, amber alerts, telephone outages, or other related information. The radio network 102 may utilize any number of transmission protocols, standards and signals including AM, FM, high definition, MTS stereo, second audio program, VHF, Internet, and other radio signals. In one embodiment, the radio network 102 may utilize dedicated VHF frequencies.

The administrative system 104 is the system and interface for managing and coordinating the broadcast, communications, and alerts transmitted by the radio network 102. In one embodiment, the administrative system 104 may communicate with any number of federal agencies, departments, monitoring stations, reporting systems, public and private databases and interfaces, and other points of communication for receiving weather related information.

The administrative system 104 and the radio network 102 may communicate with any number of other radio data and communications networks through wired and wireless communications. The administrative system 104 and the radio network 102 may include any number of transmitters, receivers, amplifiers, filters, communications lines, user interfaces, servers, satellite links, power and back up power systems, and other related systems. In one embodiment, the radio network 102 may broadcast information on one or more frequencies. For example, the radio network 102 may broadcast at the following radio frequencies: 162.400, 162.425, 162.450, 162.475, 162.500, 162.525, and 162.550. These seven channels may be reserved for weather broadcasts and may utilize a special VHF frequency band at 162 MHz.

Figure 2:
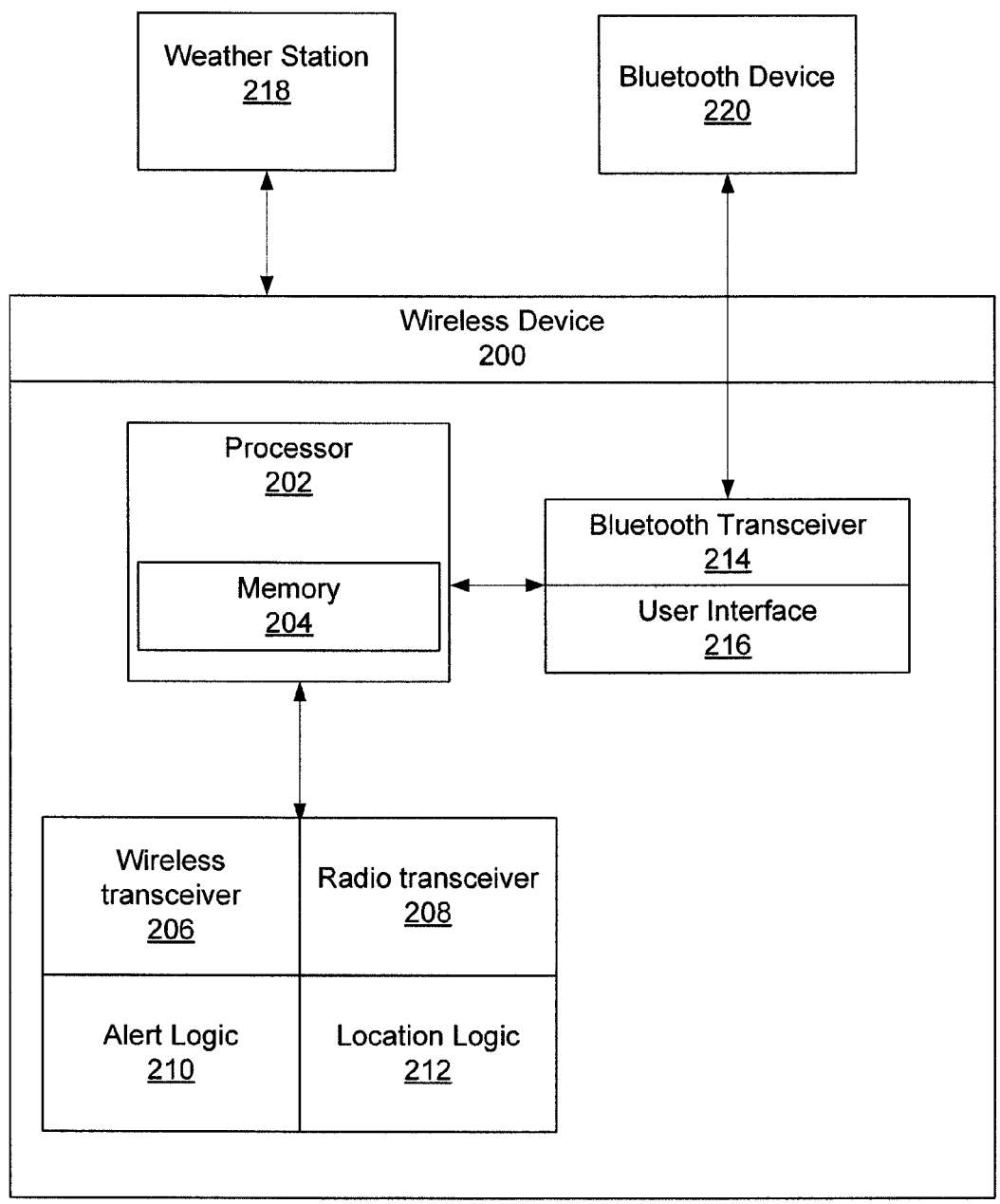
FIG. 2 is a block diagram of a wireless device in accordance with an illustrative embodiment.

The wireless devices 110 and 112 are configured and functional to receive the weather broadcast from the radio network 102 as further described in FIG. 2. As shown, the wireless devices 110 and 112 and their corresponding users may be in different locations. The wireless devices 110 and 112 may receive specific channels or frequencies broadcast from the radio network 102 in response to user preferences or based on a determined location of the wireless devices 110 and 112. As a result, the weather channel received and processed by the wireless devices 110 and 112 to communicate weather information to their respective users may be configured dynamically as the users change locations or circumstances during the day. As a result, manually input information and automatically determined information may be utilized to receive the most applicable information and alerts applicable to the user.

FIG. 2 is a block diagram of a wireless device in accordance with an illustrative embodiment. The wireless device 200 is a particular implementation of the wireless devices 110 and 112 of FIG. 1. The wireless device 200 may include any number of computing and telecommunications components, devices, or elements which may include busses, motherboards, circuits, ports, interfaces, cards, connections, transceivers, displays, antennas, and other similar components that are not described herein for purposes of simplicity. In one embodiment, the wireless device includes a processor 202, a memory 204, a wireless transceiver 206, a radio transceiver 208, alert logic 210, location logic 212, a Bluetooth transceiver 214, and a user interface 216. The wireless device 200 may further communicate with a weather station 218 and a Bluetooth device 220.

The processor 202 is circuitry or logic enabled to control execution of a set of instructions. The processor 202 may be a microprocessor, digital signal processor, central processing unit, or other device suitable for controlling an electronic device including one or more hardware and software elements, executing software, instructions, programs and applications, converting and processing signals and information, and performing other related tasks. The processor 202 may be a single chip or integrated with other computing or communications elements of the wireless device 200.

The memory 204 is a hardware element, device, or recording media configured to store data for subsequent retrieval or access at a later time. The memory 204 may be static or dynamic memory. The memory 204 may include a hard disk, random access memory, cache, removable media drive, mass storage, or configuration suitable as storage for data, instructions, and information. In one embodiment, the memory 204 and processor 202 may be integrated. The memory may use any type of volatile or non-volatile storage techniques and mediums.

The illustrative embodiment may be implemented entirely in hardware, software, firmware, or a combination thereof. In one embodiment, the wireless device 200 includes specialized circuits, chip sets, and logic to communicate the weather information to a user. In another embodiment, the components of the wireless device 200 may be stored as instructions in the memory 204 or as program applications. The instructions or applications may then be executed to perform the features, services, and methods, herein described.

The wireless transceiver 206 is the transmitter and receiver operable to communicate voice and data signals to and from the wireless device 200. The wireless transceiver 206 may utilize any number of wireless communications standards, protocols, or signals. For example, the wireless transceiver 206 may enable the wireless device 200 to send and receive voice signals, text messages, emails, Internet traffic, chat messages, and other messaging sites.

The radio transceiver 208 is the transmitter and receiver operable to receive the weather information, channels, frequencies, alerts, and other similar information. The radio transceiver 208 includes one or more antennas, filters, amplifiers, and other circuitry for receiving the special VHF frequency band at 162 MHz which has seven channels reserved for weather radio broadcasts. The radio transceiver 208 may include a decoder utilized to decode the digital-over-audio protocol digital called specific area message encoding (SAME). The SAME broadcasts or codes may include information that is separated along county lines or other geographic boundaries utilizing information, such as the Federal information processing standards (FIPS) place codes. In another embodiment, the radio transceiver 208 may only include a receiver.

The radio transceiver 208 may utilize the decoder to convert a digital/audio signal into audible, text, or tactile alerts that may be displayed, played, or otherwise communicated to the user by the wireless device 200. The alert logic 210 is the digital logic operable to determine and manage alerts communicated to the user through the user interface 216. The alert logic 210 may be digital hardware components, Boolean logic, state machines, or other logic configured to determine one or more alerts, channels, or information applicable to the wireless device 200 and corresponding user. In one embodiment, a digital weather radio broadcast may be converted into text.

The location logic 212 is the hardware and software operable to determine the exact or approximate location of the wireless device 200. In one embodiment, the location logic 212 is software performing wireless triangulation or location determination utilizing HLRs, VLRs, or other interactive database information. In another embodiment, the location logic 212 includes a GPS for determining a location of the wireless device 200. The location logic 212 may communicate the current or approximate location of the wireless device 200 to the alert logic 210.

The alert logic 210 may utilize user preferences stored in memory 204, the location determined by the location logic 212 and other criteria, parameters, factors, and settings to determine the appropriate weather information and alerts played or displayed to the user through the user interface 216. In one embodiment, the weather channels, frequencies, and information communicated by the weather station 218 may be specific to certain locations, areas, and geographic boundaries. As a result, based on the current location of the wireless device 200, the alert logic 210 may communicate one or more weather alerts when received from various weather channels. As the wireless device 200 is utilized around the country, the current location of the wireless device 200 is utilized to play the applicable weather channel and alerts. For example if the user and the wireless device 200 are determined to be in Colorado, the alert logic 210 may provide information regarding avalanches and other location based alerts. In another example, when the user is in San Francisco, the alert logic 210 may play weather alerts related to fog and earthquakes based on the weather channels communicated and applicable to that region. The alert logic 210 may utilize a channel available from the weather station 218 to determine the appropriate weather channel based on the user's location. The weather channel may utilize zip codes, cities, counties, GEO codes, or other information to determine the applicable location of the user. The alert logic 210 or the memory 204 may also store user preferences as previously described.

In another embodiment, the alert logic 210 may be configured to display secondary alerts for areas surrounding the users location and a primary alert for the user's location. The primary and secondary alerts may have distinct user preferences that control the display, audio, and tactile output of the wireless device 200 to the user. For example, the secondary alerts may be displayed as a screen of information following a vibration emitted by the wireless device 200. The primary alert may play a designate ring tone, such as a fake siren, before playing and displaying the audio alert to the user, such as "tornado warning, take cover".

The user preferences may specify and control the display of weather information and alerts to the user. In one embodiment, the user preferences may include a number of geographic locations for which the user selects to receive weather information and alerts. For example, the user may have family that lives in areas or locations close to the user. As a result, the user may receive weather information and alerts applicable to other zip codes, cities, or areas that are not applicable to the user based on the current location of the wireless device 200 determined by the location logic 212. For example, the user preferences may store locations and corresponding channels to monitor family location in order to display information and alerts. In another embodiment, the weather of the user's home and business may normally travel in a specific direction from west to east, and as a result, the user may select to receive weather information and alerts or locations to the west of the location of the wireless device 200 in order to provide more time to prepare for severe weather events or warnings.

In another embodiment, the user may configure the wireless device 200 to send a text, email, or chat message to one or more users in response to receiving an alert or warning. The alert or warning may be received as a specific alert or may be determined from weather information broadcast to the wireless device 200 utilizing voice-to-text conversion, digital processing, key word recognition, and other logic. The user may also be prompted to call one or more users based on the alerts monitored and received. As a result, the user may be able to watch over family members and friends that may not have the ability to monitor important weather information utilizing their wireless devices.

The user preferences stored within the alert logic 210 may also specify that severe weather alerts are communicated or displayed to the user through the user interface 216 differently than typical weather information. For example, severe weather alerts may be displayed or simulated as a text message to the user. For example, the weather alert and the associated details which may include location, type of event, time line, severity, or suggested actions may be displayed as if a text message had been received, even though the information is internally generated by the wireless device 200. In another embodiment, the alert logic 210 may store user preferences indicating the wireless device 200 is to ring and vibrate constantly once a weather alert is detected until a user deactivates the alert or the wireless device 200. For example, if a tornado alert is received, the user interface 216 may play a high pitch alarm until the user provides user input acknowledging the alert.

The alert logic 210 may also insert a voice-to-text converter that converts the weather information and alert into text displayable to the user through the user interface 216. The user interface 216 is the interface for communicating information, data, and text to the user and receiving user input. The user interface 216 may include speakers, microphones, one or more screens, a touch screen, a tract ball, one or more interface buttons, a scroll wheel, and other interface elements. The user interface 216 may also communicate utilizing tactile information, including vibrations, Braille, and other similar communications.

The Bluetooth transceiver 214 is the transmitter and receiver operable to communicate with one or more Bluetooth devices, including the Bluetooth device 220. The Bluetooth transceiver 214 may be configured to interact with the alert logic 210 to communicate information and alerts to the Bluetooth device 220 when received. For example, an earthquake warning received from the weather station 218 may be processed by the alert logic 210 and communicated for audio playback to the Bluetooth device 220 by the Bluetooth transceiver 214. The Bluetooth device 220 may be a GPS, mp3 player, wireless earpiece, electronic pen, interactive glasses, vehicle system, radio, television, or other device configured to communicate with the wireless device 200 through a Bluetooth connection or similar communication standard, protocol, or signal.

Figure 3:
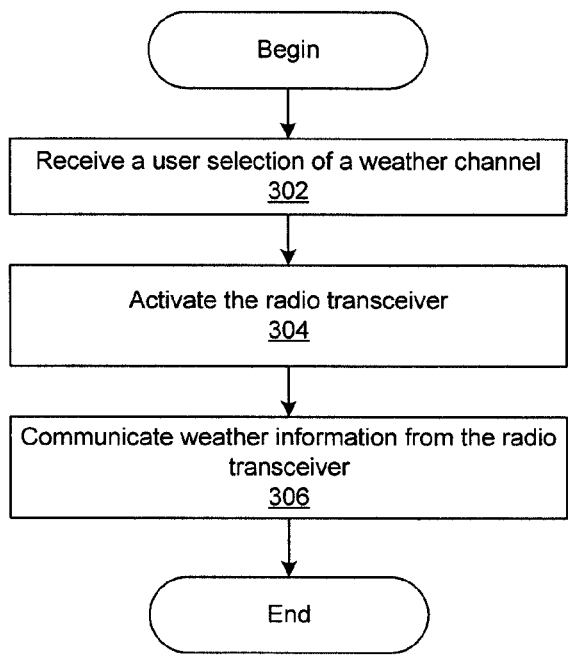
FIG. 3 is a flowchart of a process for receiving weather information in accordance with an illustrative embodiment.

FIG. 3 is a flowchart of a process for receiving weather information in accordance with an illustrative embodiment. The process of FIG. 3 may be implemented by a wireless device, such as a cell phone. In one embodiment, the process may begin by receiving a user selection of a weather channel (step 302). In one embodiment, the user selection is manual input from the user selecting from a number of weather channels, such as distinct weather channels transmitting weather information and the like. In another embodiment, the user selection may be user preferences stored by the wireless device. For example, the user may specify any number of locations for which weather information and alerts are to be received.

The locations may include zip codes, GEO codes, cities, counties, states, regions, and other geographically defined boundaries. The user selection may alternatively be a determination of a location of the wireless device and user. For example, wireless triangulation, a virtual location register or home location register, or GPS may be utilized to determine the location of the wireless device and user. The weather channel may be automatically selected based on the determined location.

Next, the wireless device activates the radio transceiver (step 304). In one embodiment, the radio transceiver may be powered on in order to acquire or tune in to the weather channel selected in step 302. In another embodiment, the radio transceiver may activated in response to a condition, setting, or parameter being met. For example, the radio transceiver may be activated in response to determining an alert as being received is applicable to the user of the wireless device. For example, a severe thunderstorm watch or an earthquake alert sent through the applicable weather channel may activate the radio transceiver for additional communications.

Next, the wireless device communicates information from the radio transceiver (step 306). The information may include daily reports of temperature, humidity, barometric readings, sunrise and sunset, forecast, temperatures, due point, potential events and other related information. The information may also include public, private, or governmental alerts, including hurricanes, earthquakes, avalanches, tidal waves, terrorist event, chemical or biohazards, accident, evacuation, or other general warnings or advisories. The user preference may specify how the information is communicated, displayed, or played to the user. For example, day-to-day weather information may be displayed within a special display screen of the wireless device. In another embodiment, the wireless device may ring as if call is incoming and then play the live or stored information included in the weather broadcast to the user.

Figure 4:
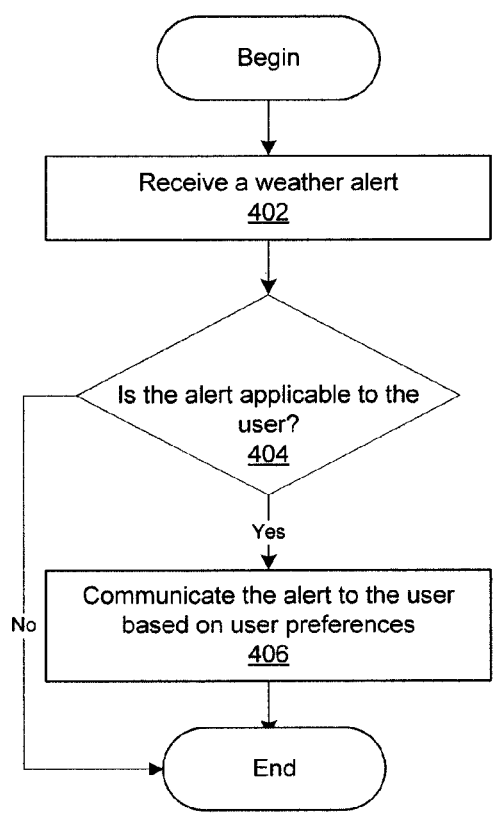
FIG. 4 is a flowchart of a process for receiving weather alerts in accordance with an illustrative embodiment.

FIG. 4 is a flowchart of a process for receiving weather alerts in accordance with an illustrative embodiment. The process of FIG. 4 may also be implemented by a wireless device. The process may begin by receiving a weather alert (step 402). The weather alert may be received as a digital or analog broadcast. In one embodiment, the digital broadcast may be converted to a text or audio form that may be communicated to the user. In another embodiment, the weather alert may be received, or determined to be received, by converting the audio signal into a text format. The digital, text, or audio format may be analyzed for words, codes, or other indicators that specify the information is a weather alert.

Next, the wireless device determines whether the alert is applicable to the user (step 404). The determination of step 404 may be implemented based on user preferences, location, and other information as previously described. In response to the wireless device determining the alert is not applicable to the user, the process ends. If the wireless device determines the alert is applicable to the user in step 404, the wireless device communicates the alert to the user based on user preferences (step 406). The user preferences of step 406 may specify whether the alert is communicated visually, textually, graphically, audibly, tactily, or through other interface elements of the wireless device. For example, typical weather information may be displayed in a dedicated screen or application available through the wireless device, whereas severe weather alerts may simulate a text message received by the wireless device. In another embodiment, the weather alerts may simulate a telephone call before playing the live weather alert or a buffered or stored version to the user in response to answering the phone.

The previous detailed description is of a small number of embodiments for implementing the invention and is not intended to be limiting in scope. One of skill in this art will immediately envisage the methods and variations used to implement this invention in other areas than those described in detail. The following claims set forth a number of the embodiments of the invention disclosed with greater particularity.

What is claimed as new and desired to be protected by Letters Patent of the United States is:

1. A method for processing weather alerts through a cell phone, the method comprising:
   storing, in a memory, user preferences specifying one or more locations for which a user selects to receive weather alerts;
   receiving, with the cell phone, cellular communications through a cellular network;
   receiving, with the cell phone, one or more channels of a dedicated radio network for providing a weather service through the cell phone separate from the cellular network, wherein the one or more channels are enabled to be received simultaneously with the cellular communications, wherein the one or more channels are an AM/FM broadcast;
   receiving, with the cell phone, one or more weather alerts through the one or more channels of the dedicated radio network providing the weather service;

determining, with the cell phone, whether the one or more weather alerts received from the weather service through the one or more channels of the dedicated radio network are applicable to a user of the cell phone;

converting, with the cellular phone, the one or more weather alerts from the AM/FM broadcast to a text format and into a tactile alert;

providing the tactile alert with the cellular phone;

playing a designated ring tone based on the one or more weather alerts;

visually displaying the converted one or more weather alerts in the text format on a display of the cell phone as a simulated text message in response to determining the one or more weather alerts are applicable to the user;

sending a short range wireless signal, wherein the short range wireless signal contains the one or more weather alerts, from the cell phone to the wearable device worn by the user to communicate the one or more weather alerts to the user of the cell phone through the wearable device worn by the user; and based on the user preferences, sending the one or more weather alerts from the cellular phone as a text message to another user.

2. The method according to claim 1, wherein the weather service is the National Oceanic and Atmospheric Administration.

3. The method according to claim 1, wherein the one or more weather alerts are specific area message encoding (SAME) messages.

4. The method according to claim 1, wherein the short range wireless signal is a Bluetooth signal.

5. The method according to claim 1, further comprising:
determining a location of the cell phone;
receiving the one or more weather alerts for the location of the cell phone.

6. The method according to claim 5, wherein the location of the cell phone is determined utilizing triangulation.

7. The method according to claim 5, wherein the one or more weather alerts are communicated based on user preferences stored in the cell phone.

8. The method according to claim 1, wherein the location of the cell phone is determined utilizing a global positioning location of the cell phone.

9. The method of claim 1, further comprising:
based on a determination that one of the weather alerts is a severe weather alert, providing the tactile alert and playing the designated ring tone constantly until deactivated by a user.

10. A cell phone for receiving weather alerts, the cell phone comprising:
a wireless transceiver configured to receive cellular signals from a cellular network;
a transceiver configured to receive one or more weather channels of a dedicated radio network separate from the cellular network, wherein the weather channels are an AM/FM broadcast;
alert logic configured to determine a location of the user, to determine, based on user preferences, whether one or more alerts received through the one or more weather channels of the dedicated radio network are applicable to the location of a user of the cell phone, to convert the one or more alerts from the AM/FM broadcast to a text format and into a tactile alert, to send a short range wireless signal, wherein the short range wireless signal contains the one or more weather alerts, from the cell phone to the wearable device worn by the user to communicate the one or more weather alerts to the user of the cell phone through the wearable device worn by the user, to display the converted one or more alerts on a display device of the cell phone, and based on user configuration, send the one or more alerts as a text message to another user;
a memory in communication with the alert logic, the alert logic configured to store the user preferences, the user preferences specifying one or more locations for which the user selects to receive the one or more alerts; and
a user interface configured to play a designated ringtone based on the one or more alerts, provide the tactile alert, display the one or more alerts in the textual format to the user.

11. The cell phone according to claim 10, further comprising:
location logic in communication with the alert logic, the location logic is configured to determine the location of the user utilizing wireless triangulation.

12. The cell phone according to claim 10, further comprising:
a global positioning system in communication with the alert logic, the GPS is configured to determine the location of the user.

13. A cell phone for communicating weather alerts, comprising:
a processor operable to execute a set of instructions;
a memory in communication with the processor, the memory being operable to store the set of instructions, the set of instructions being operable to:
store, in the memory, user preferences specifying one or more locations for which a user selects to receive weather alerts;
receive cellular communications through a cellular network;
receive one or more channels providing a weather service through the cell phone utilizing a dedicated radio network separate from the cellular network, wherein the one or more channels are an AM/FM broadcast;
receive one or more weather alerts through the one or more radio channels of the weather service, the one or more weather alerts being associated with the location of the cell phone;
determine whether the one or more weather alerts received through the one or more radio channels of the weather service are applicable to a user of the cell phone;
convert the one or more weather alerts from the AM/FM broadcast to a textual format and into a tactile alert;
provide the tactile alert with the cellular phone;
play a designated ring tone based on the one or more weather alerts;
visually display the converted one or more weather alerts in the text format to the user through a display of the cell phone in response to determining the one or more weather alerts are applicable to the user;
send a short range wireless signal, wherein the short range wireless signal contains the one or more weather alerts, from the cell phone to the wearable device worn by the user to communicate the one or more weather alerts to the user of the cell phone through the wearable device worn by the user; and
based on the user preferences, send the one or more weather alerts as a text message to another user.

14. The cell phone according to claim 13, wherein the set of instructions are further executed to:
   determine the location of the user.

15. The cell phone according to claim 13, wherein the set of instructions are further executed to:
   display the one or more weather alerts in a specific area message encoding format.

\* \* \* \* \*